United States Patent
Au et al.

(10) Patent No.: US 8,712,153 B2
(45) Date of Patent: *Apr. 29, 2014

(54) SUBPIXEL-BASED IMAGE DOWN-SAMPLING

(75) Inventors: Oscar Chi Lim Au, Hong Kong (CN); Lu Fang, Hong Kong (CN)

(73) Assignee: Dynamic Invention LLC, Mahe (SC)

( * ) Notice: Subject to any disclaimer, the term of this patent is extended or adjusted under 35 U.S.C. 154(b) by 34 days.

This patent is subject to a terminal disclaimer.

(21) Appl. No.: 13/043,703

(22) Filed: Mar. 9, 2011

(65) Prior Publication Data

US 2011/0222770 A1    Sep. 15, 2011

Related U.S. Application Data

(60) Provisional application No. 61/282,620, filed on Mar. 9, 2010.

(51) Int. Cl.
*G06K 9/34* (2006.01)

(52) U.S. Cl.
USPC .................................................. 382/173

(58) Field of Classification Search
None
See application file for complete search history.

(56) References Cited

U.S. PATENT DOCUMENTS

| | | | |
|---|---|---|---|
| 5,341,153 A | | 8/1994 | Benzschawel |
| 6,608,632 B2 | | 8/2003 | Daly et al. |
| 8,108,487 B2 | * | 1/2012 | Kikinis .......................... 709/217 |
| 2007/0177462 A1 | | 8/2007 | Gendron |
| 2010/0045695 A1 | * | 2/2010 | Brown Elliott et al. ...... 345/589 |
| 2011/0126110 A1 | | 5/2011 | Vilke et al. |

OTHER PUBLICATIONS

Lu Fang; Au, O.C.; Yi Yang; Weiran Tang; Xing Wen; , "A new adaptive subpixel-based downsampling scheme using edge detection," Circuits and Systems, 2009. ISCAS 2009. IEEE International Symposium on , vol., No., pp. 3194-3197, May 24-27, 2009 doi: 10.1109/ISCAS.2009.5118482.*

Kim and Kim, "A filter design algorithm for subpixel rendering on matrix displays," EUSIPCO, pp. 1487-1491, 2007. (hereafter 'Kim').*

Amano, "A Flat-Panel TV Display System in Monochrome and Color", IEEE Trans. on Electronic Devices, vol. 22, No. 1, pp. 1-7, 1975.

E. Brown, C. H. Brown, et. al., "Co-Optimization of Color AMLCD Subpixel Architecture and Rendering Algorithms", SID Digest, pp. 172-175, 2002.

(Continued)

*Primary Examiner* — Atiba O Fitzpatrick
*Assistant Examiner* — Thomas A James
(74) *Attorney, Agent, or Firm* — Amin, Turocy & Watson, LLP

(57) ABSTRACT

Systems, methods, and apparatus for sampling images using minimum mean square error subpixel-based down-sampling (MMSE-SD) are presented herein. A partition component can receive a first array of pixels, and divide the first array of pixels into two-dimensional (2-D) blocks of pixels. Further, a sampling component can diagonally down-sample subpixels of a block of the 2-D blocks, and generate a second array of pixels based on the down-sampled subpixels. The sampling component can alternately sample subpixels of adjacent pixels of the block in a diagonal direction, and generate the second array of pixels based on the subpixels. A reconstruction component can create a virtual image based on, at least in part, the second array of pixels. A MMSE-SD component can determine an optimal low resolution image based on, at least in part, respective color components of the virtual image and a high resolution image associated with the first array of pixels.

20 Claims, 13 Drawing Sheets

(56) References Cited

OTHER PUBLICATIONS

L. M. Chen, S. Hasegawa, "Influence of Pixel-Structure Noise on Image Resolution and Color for Matrix Display Devices", J. SID 1/1, pp. 103C110, 1993.

M. A. Klompenhouwer, G. de Haan, Subpixel Image Scaling for Color Matrix Displays, SID Digest, pp. 176-180, 2002. ics.ele.tue.nl/~dehaan/pdf/90_sid2003.pdf.

S. Gibson, "Sub-Pixel Font Rendering Technology", from http://www.grc.com/cleartype.htm.

C. Betrisey, J. F. Blinn, et. al., "Displaced Filtering for Patterned Displays", SID Symposium Digest of Technical Papers, vol. 31, pp. 296-299, 2000.

J.C. Platt, "Optimal Filtering for Patterned Displays", IEEE Signal Processing Letters, vol. 7, No. 7, pp. 179-181, Jul. 2000.

S.J. Daly, "Analysis of Subtriad Addressing Algorithms by Visual System Models", SID Digest, pp. 1200-1203, 2001. ftp://153.97.110.35/PrPro-Daten/2001-SID2001/docs/47_03.pdf.

D. S. Messing, S. J. Daly, "Improved Display Resolution of Subsampled Color Images using Subpixel Addressing", Proc. IEEE Int. Conf. on Image Processing, vol. 1, pp. 22-25, Sep. 2002.

S. Kim, C. S. Kim, "A Filter Design Algorithm for Subpixel Rendering on Matrix Displays", Proc. European Signal Processing Conf., 2007. www.eurasip.org/Proceedings/Eusipco/Eusipco2007/.../c3l-b02.pdf.

Silverstein et al., "Color Matrix Display Image Quality: The Effects of Luminance and Spatial Sampling", SID Digest, pp. 29C32, 1990.

Silverstein, et. al., "A Psychophysical Evaluation of Pixel Mosaics and Gray-scale Requirements for Color Matrix Displays", SID Digest, pp. 128C131, 1989.

Yong Ge Tian, "Some Equalities for Generalized Inverses of Matrix Sums and Block Circulant Matrices", Archivum Mathematicum, vol. 37, No. 4, pp. 301-306, 2001.

G. J. Tee, "Eigenvectors of Block Circulant and Alternating Circulant Matrices", Res. Lett. Inf. Math. Sci., vol. 8, pp. 123-142, 2005. http://www.massey.ac.nz/massey/fms/Colleges/College%20of%20Sciences/IIMS/RLIMS/Volume08/Eigenvectors_of_block_circulant_and_alternating_circulant_matrices.pdf.

R. M. Gray, "Toeplitz and Circulant Matrices: A Review", Foundations and Trends in Communications and Information Theory, vol. 2, No. 3, pp. 155C239, 2006. ee.stanford.edu/~gray/toeplitz.pdf.

T. De Mazancourt, D. Gerlic, "The Inverse of a BlockCirculant Matrix", IEEE Trans. on Antennas and Propagation, vol. 31, No. 5, pp. 808-810, 1983.

Diniz et al. (2002), Digital Signal Processing: System Analysis and Design, Cambridge University Press., ISBN 0521781752.

ITU, recommendation ITU-R BT.601-5, 1995; http://www.itu.int/dms_pubrec/itu-r/rec/bt/R-REC-BT.601-5-199510-S!!PDF-E.pdf.

Non-Final Office Action for U.S. Appl. No. 13/157,116 dated Mar. 5, 2012, 63 pages.

Fang et al., "A new adaptive subpixel-based downsampling scheme using ede detection," Circuits and Systems, 2009. ISCAS 2009 IEEE Intl Symposium on, pp. 3194-3197, May 24-27, 2009.

OA dated Feb. 1, 2013 for U.S. Appl. No. 13/157116, 36 pages.

* cited by examiner

SUBPIXEL-BASED IMAGE DOWN-SAMPLING

PRIORITY CLAIM

This application claims priority to U.S. Provisional Patent Application Ser. No. 61/282,620, filed on Mar. 9, 2010, entitled "NOVEL 2-D MMSE SUBPIXEL-BASED IMAGE DOWN-SAMPLING." The entirety of the aforementioned application is incorporated by reference herein.

TECHNICAL FIELD

This disclosure relates generally to image processing including, but not limited to, minimum mean square error subpixel-based down-sampling (MMSE-SD).

BACKGROUND

With the advance of portable technologies, down-sampling of high resolution image information is often required to display high resolution images(s) and/or video(s), e.g., high-definition (HD) television (HDTV) information, HD movies, etc. on a lower resolution display, e.g., included in a handheld device such as a cellular phones, a portable multimedia player (PMP), a personal data assistant (PDA), etc.

A color pixel of a high resolution matrix display, e.g. liquid crystal display (LCD), plasma display panel (PDP), etc. includes three subpixels, each subpixel representing one of three primary colors, i.e., red (R), green (G), and blue (B). Although the subpixels are not separately visible, they are perceived together as color(s). One conventional technique for down-sampling a high resolution, e.g., color, image is pixel-based down-sampling, which selects every third pixel of the high resolution image to display. Such down-sampling severely affects shapes and/or details of the image, as over 30% of information of the image is compressed (or lost). Further, pixel-based down-sampling causes aliasing, or distortion, of the image near shape edges.

Another conventional technique for down-sampling a high resolution image is subpixel-based down-sampling, which alternately selects red, green, and blue subpixels from consecutive pixels of a block of pixels of the high resolution image in a horizontal direction. As such, the (i,j) pixel in the downsampled image includes subpixels ($R_{i,j}$, $G_{i,j+1}$, $B_{i,j+2}$) of the block of pixels—the subscripts denoting pixel indices of the block of pixels. Although such subpixel-based down-sampling preserves the shapes of images more effectively than pixel-based down-sampling, resulting subpixel-based images incur more color fringing, i.e., artifacts, around non-horizontal edges than pixel-based downsampled images.

The above-described deficiencies of today's image down-sampling techniques and related technologies are merely intended to provide an overview of some of the problems of conventional technology, and are not intended to be exhaustive. Other problems with the state of the art, and corresponding benefits of some of the various non-limiting embodiments described herein, may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject disclosure. Its sole purpose is to present some concepts of the disclosed subject matter in a simplified form as a prelude to the more detailed description presented later.

To correct for the above identified deficiencies of today's image processing environments and other drawbacks of conventional image down-sampling environments, various systems, methods, and apparatus described herein sample images using MMSE-SD.

For example, a method can include partitioning a two-dimensional (2-D) array of pixels into 2-D blocks of pixels; alternately sampling subpixels of a block of pixels of the 2-D blocks of pixels in a diagonal direction; and generating an image based on a result of the alternately sampling subpixels of the block of pixels. Further, the method can include deriving, based on the image, a virtual image according to a size of an other image associated with the 2-D array of pixels. The generating the image can include minimizing a mean square error between the virtual image and the other image; and determining at least one color component of a low resolution image associated with the result based on a block circulant matrix.

In another example, a system can include a partition component configured to receive a first array of pixels; and divide the first array of pixels into two-dimensional (2-D) blocks of pixels. Further, the system can include a sampling component configured to diagonally down-sample subpixels of a block of the 2-D blocks; and generate a second array of pixels based on the down-sampled subpixels. Furthermore, the sampling component can alternately sample a red subpixel, a green subpixel, and a blue subpixel of adjacent pixels of the block in a diagonal direction; and generate the second array of pixels based on the red subpixel, the green subpixel, and the blue subpixel.

Moreover, the system can include a reconstruction component configured to create a virtual image based on, at least in part, the second array of pixels. The reconstruction component can create the virtual image utilizing a directional weighted average of neighboring subpixels of the second array of pixels. Further, the system can include a minimum mean square error (MMSE) subpixel-based down-sampling (MMSE-SD) component configured to determine an optimal low resolution image based on, at least in part, respective color components of the virtual image and a high resolution image associated with the first array of pixels. The MMSE-SD component can minimize a mean square error between the virtual image and the high resolution image; and determine the optimal low resolution image based on the mean square error.

In yet another example, an apparatus can include means for dividing a high resolution image into blocks of pixels; means for selecting subpixels of a block of the blocks in a diagonal direction; and means for creating a low resolution image based on the selected subpixels. Further, the apparatus can include means for creating a virtual high resolution image using the low resolution image; means for minimizing a mean square error between the high resolution image and the virtual image; and means for determining an optimal low resolution image based on an output of the means for minimizing the mean square error.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
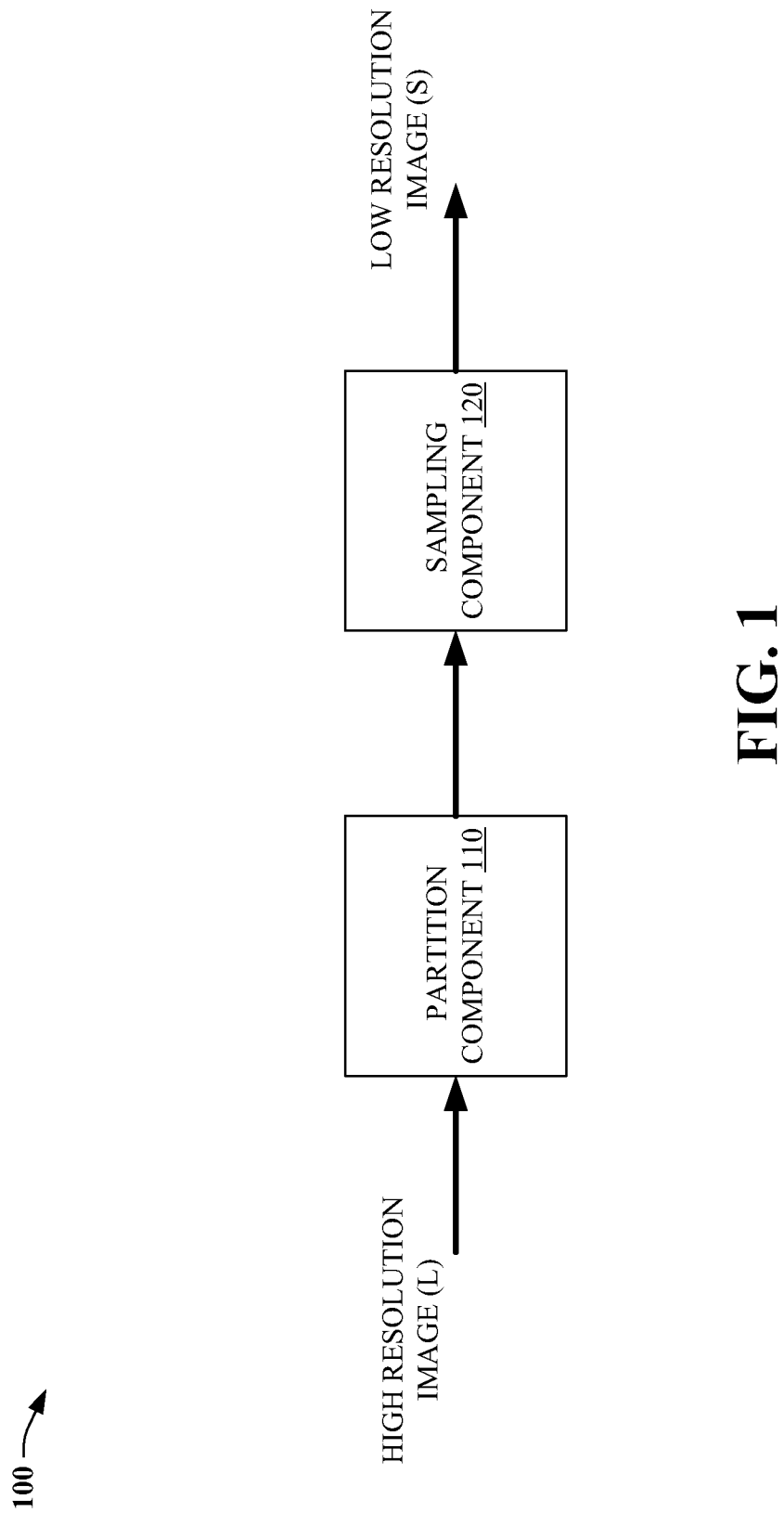
FIG. 1 illustrates a block diagram of a subpixel-based down-sampling system, in accordance with an embodiment.

Various non-limiting embodiments of systems, methods, and apparatus presented herein sample images using minimum mean square error subpixel-based down-sampling (MMSE-SD).

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to automatically partition, e.g., via partition component 110, a 2-D array of pixels into 2-D blocks of pixels. Further, the artificial intelligence system can be used to automatically alternately sample, e.g., via sampling component 120, subpixels of a block of pixels of the 2-D blocks of pixels in a diagonal direction; and generate an image based on such sampling. Furthermore, the artificial intelligence system can derive, e.g., via reconstruction component 710, a virtual image according to a size of another image associated with the 2-D array of pixels.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

Conventional downsampling techniques negatively affect shapes and/or details of a sampled image, causing aliasing of the sampled image near shape edges, and/or causing increased color fringing around non-horizontal edges of the sampled image. Compared to such technology, various systems, methods, and apparatus described herein in various embodiments can improve sampling of images by using MMSE-SD.

Referring now to FIG. 1, a block diagram of a subpixel-based down-sampling system 100 is illustrated, in accordance with an embodiment. Aspects of system 100, and systems, networks, other apparatus, and processes explained herein can constitute machine-executable instructions embodied within machine(s), e.g., embodied in one or more computer readable mediums (or media) associated with one or more machines. Such instructions, when executed by the one or more machines, e.g., computer(s), computing device(s), virtual machine(s), etc. can cause the machine(s) to perform the operations described.

Additionally, the systems and processes explained herein can be embodied within hardware, such as an application specific integrated circuit (ASIC) or the like. Further, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

As illustrated by FIG. 1, system 100 can include partition component 110 and sampling component 120. As described above, down-sampling is a procedure that can be used to display high resolution images/video via lower resolution devices. In an aspect, partition component 110 can receive a high resolution image (L) including a two-dimensional (2-D) array of pixels. Further, partition component can partition, divide, etc. the 2-D array of pixels into 2-D blocks of pixels, e.g., into blocks including a 3×3 array of pixels. Sampling component 120 can down-sample each block, or 3×3 array of pixels, by selecting, sampling, etc. subpixels of pixels of the block in a diagonal direction to generate a low resolution image (S).

Figure 2:
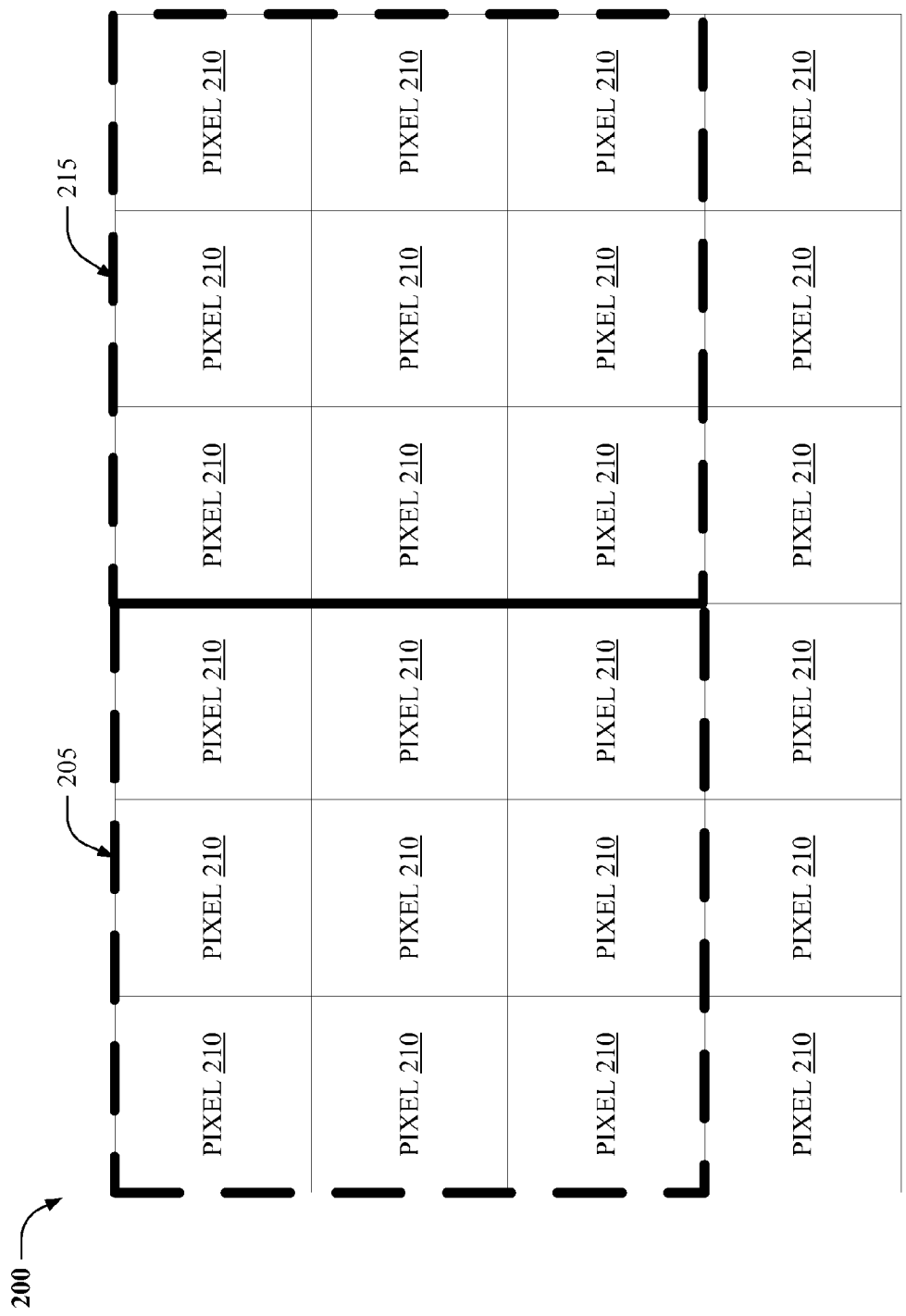
FIG. 2 illustrates a block diagram of a two-dimensional high resolution image, in accordance with an embodiment.
Figure 3:
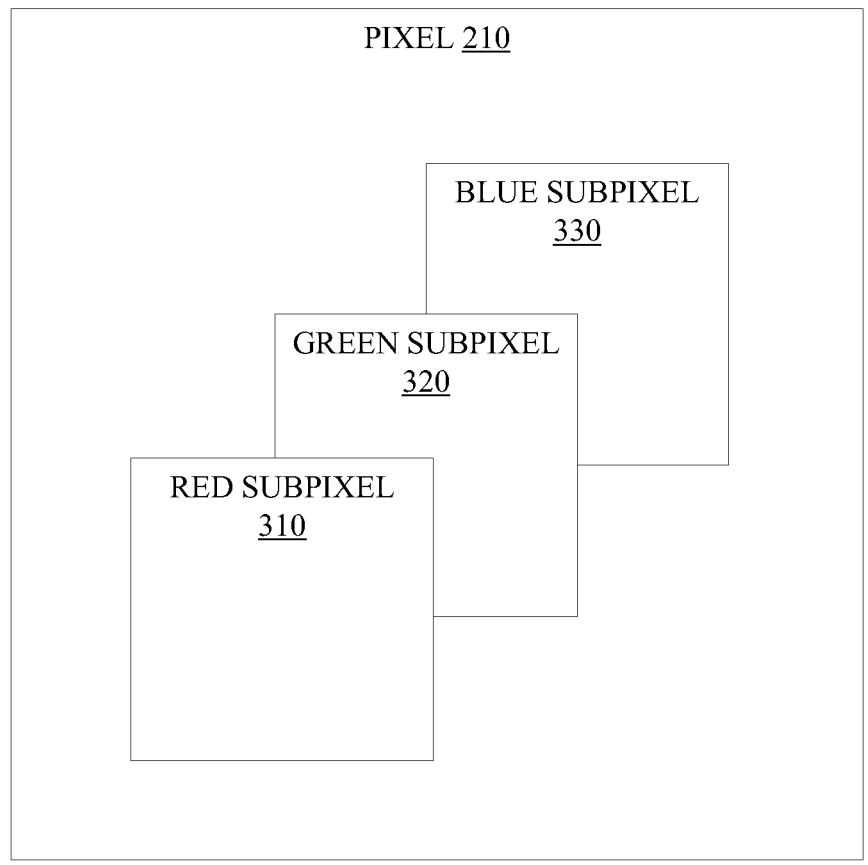
FIG. 3 illustrates a block diagram of a pixel, in accordance with an embodiment.

FIG. 2 illustrates a block diagram of a 2-D high resolution image (L) 200 including pixels 210, in accordance with an embodiment. Pixels 210 are addressable screen elements of a display, arranged in a 2-D grid. Each pixel 210 is addressed by coordinates (not shown), which can be arbitrarily assigned and/or re-assigned during image processing. As illustrated by FIG. 3, pixel 210 can include three subpixels: red subpixel 310, green subpixel 320, and blue subpixel 330. Subpixels 310, 320, and 330, which together represent color when perceived at a distance, are also addressed by coordinates.

Figure 4:
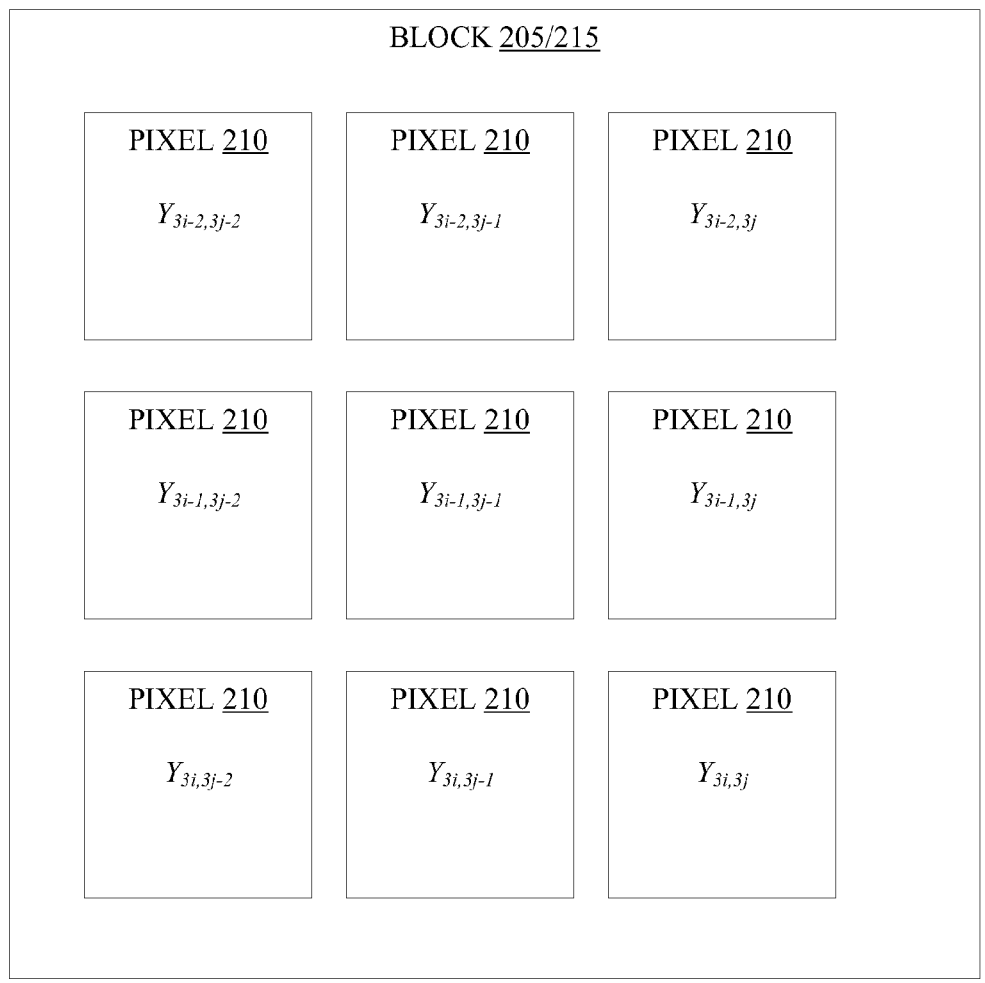
FIG. 4 illustrates a block diagram of a subpixel-based down-sampling model, in accordance with an embodiment.
Figure 5:
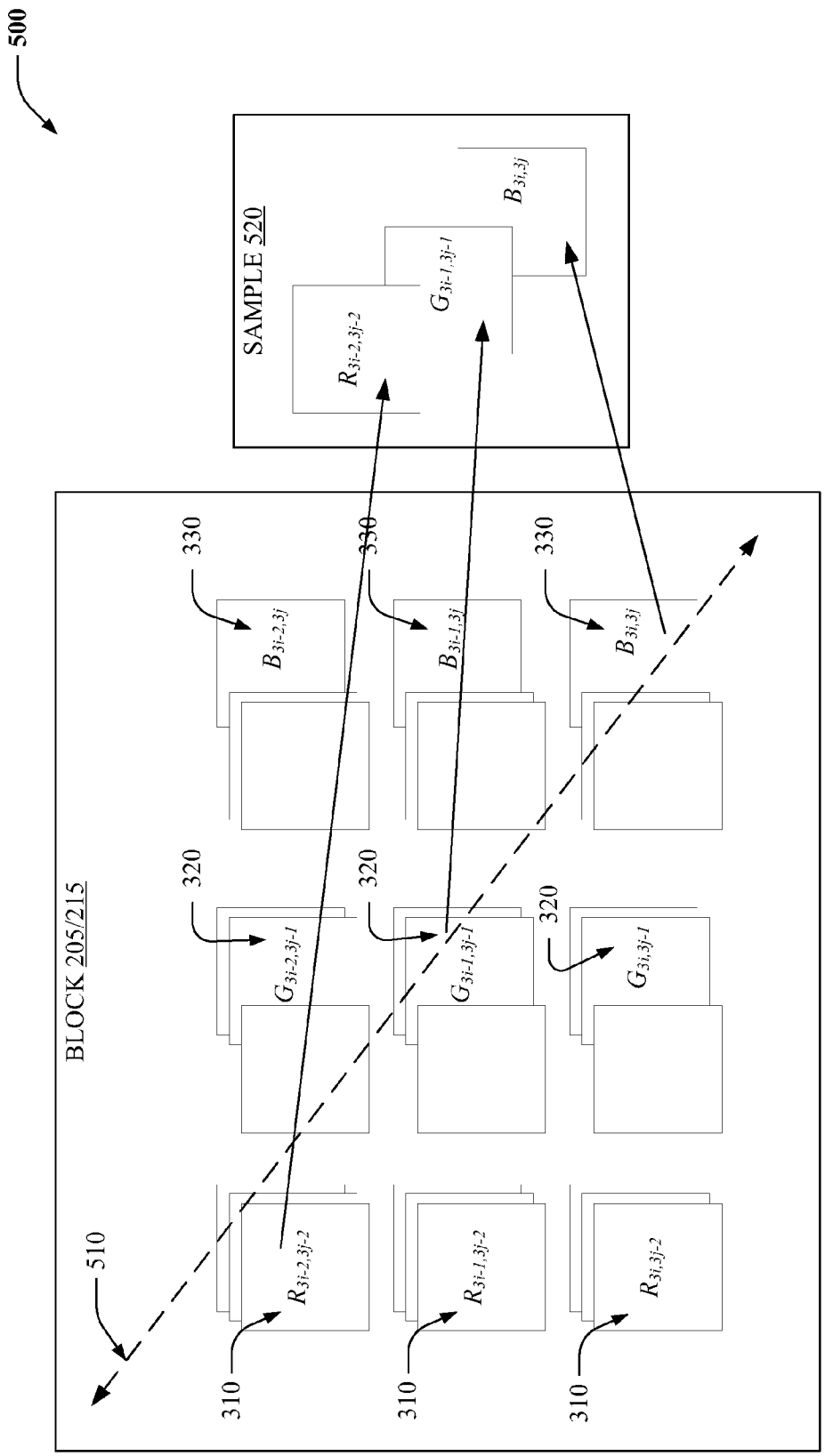
FIG. 5 illustrates an example of down-sampling a block of pixels, in accordance with an embodiment.

Referring now to FIG. 2, partition component 110 can be configured to divide high resolution image 200 into at least two blocks 205 and 215 that include a 3×3 array of pixels 210. In one embodiment, high resolution image 200 can include 3M×2N pixels. Further, in another aspect illustrated by FIG. 4, partition component 110 can associate coordinates (i,j) with pixels 210 of blocks 205 and 215. As such, as illustrated by FIG. 5, sampling component 120 can be configured to diagonally select, copy, sample, etc. red subpixel 310 at coordinate $R_{3i-2,3j-2}$, green subpixel 320 at coordinate $G_{3i-1,3j-1}$, and blue subpixel 330 at coordinate $B_{3i,3j}$ from pixels 210 of blocks 205/215 in a first diagonal direction 510 to create sample 520 corresponding to a pixel of the low resolution, down-sampled, image S (see FIG. 1). As such, down-sampled, low-resolution image S can include M×N pixels corresponding to the 3M×2N pixels of high resolution image 200.

Figure 6:
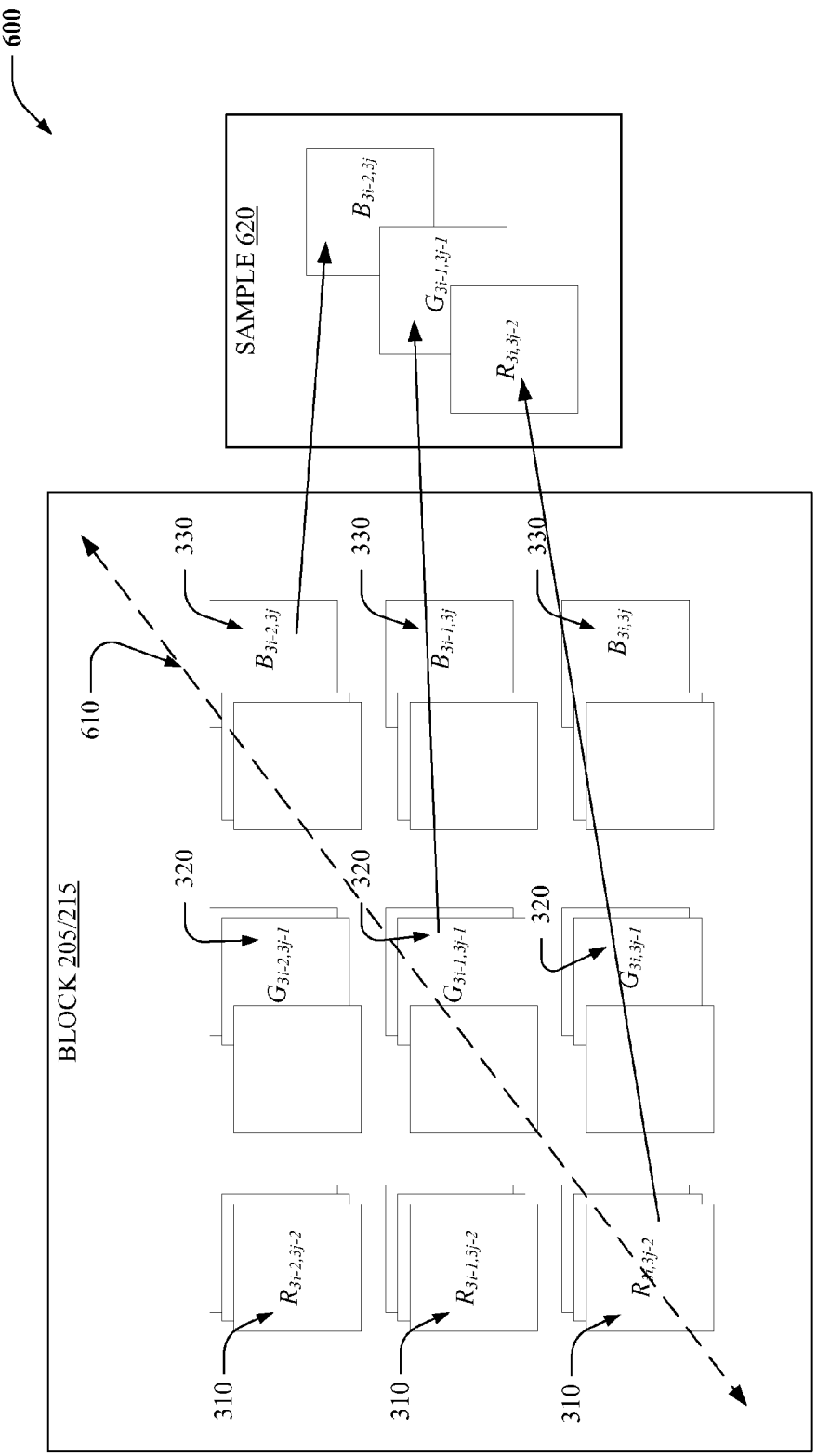
FIG. 6 illustrates another example of down-sampling a block of pixels, in accordance with an embodiment.

In another embodiment illustrated by FIG. 6, sampling component 120 can be configured to diagonally select, copy, sample, etc. red subpixel 310 at coordinate $R_{3i,3j-2}$, green subpixel 320 at coordinate $G_{3i-1,3j-1}$, and blue subpixel 330 at coordinate $B_{3i-2,3j}$ from pixels 210 of blocks 205/215 in a second diagonal direction 610 to create sample 620 corresponding to a $(i,j)^{th}$ pixel $(r_{i,j}, g_{i,j}, b_{i,j})$ of the low resolution, down-sampled image S. As such, system 100 can more effectively preserve shape details of a high resolution image than conventional down-sampling techniques.

Figure 7:
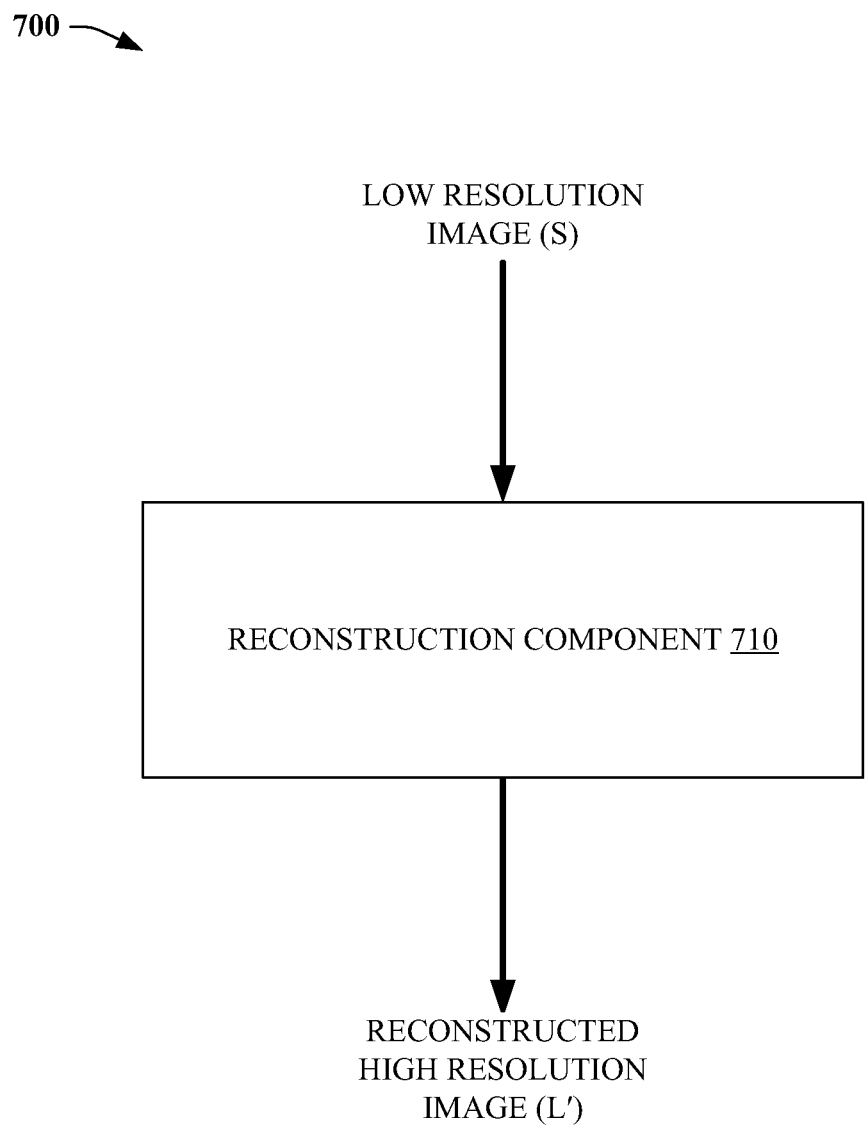
FIG. 7 illustrates a block diagram of a system for reconstructing a high resolution image, in accordance with an embodiment.
Figure 8:
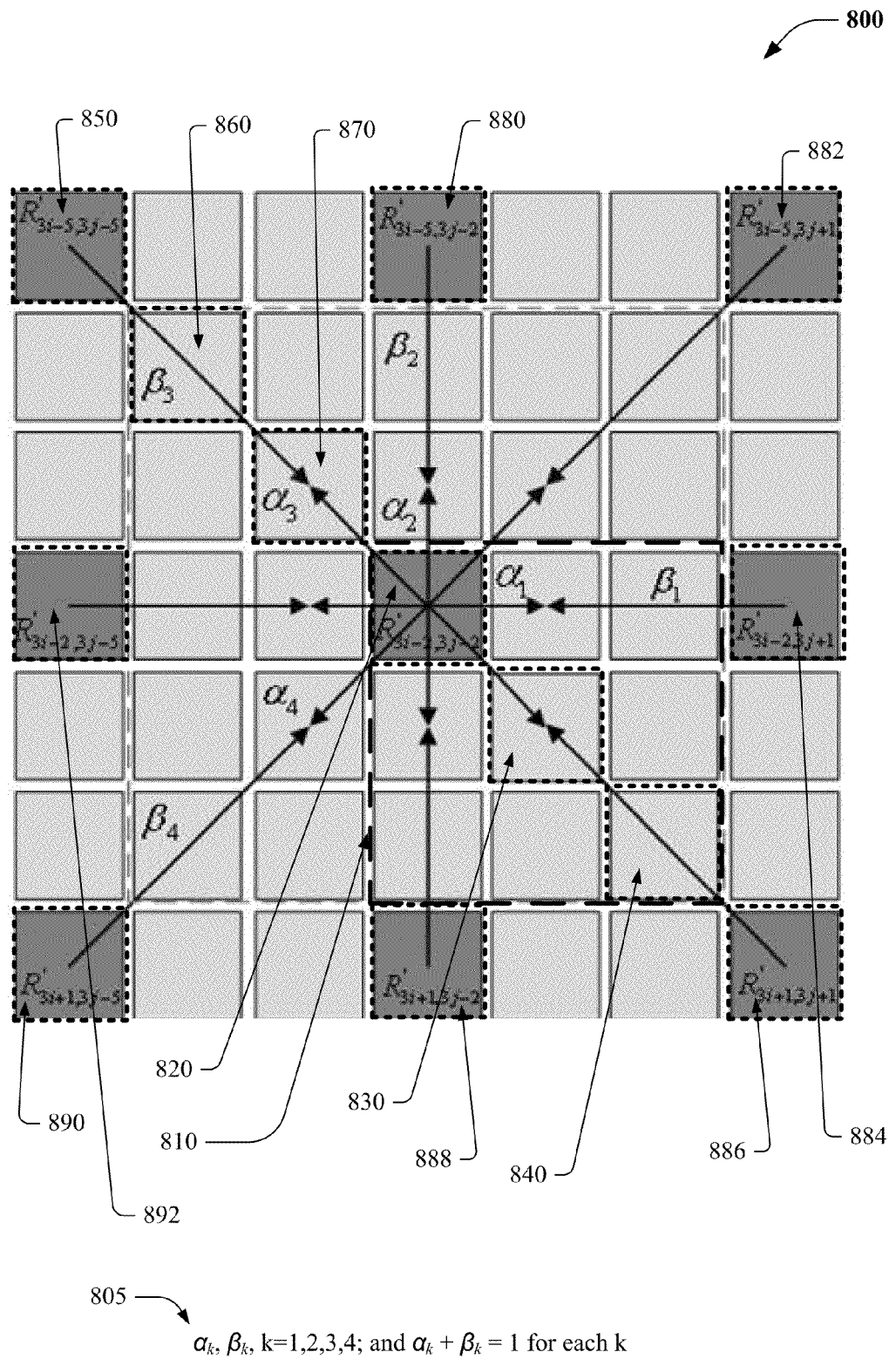
FIG. 8 illustrates a block diagram of a subpixel-based reconstruction model, in accordance with an embodiment.

Now referring to FIG. 7, a block diagram of a system 700 for reconstructing a high resolution image L is illustrated, in accordance with an embodiment. System 700 can include a reconstruction component 710 that can be configured to receive a low resolution image, e.g., low resolution image S generated by sampling system 100. In an aspect, reconstruction component 710 can be configured to derive a virtual image (L'), approximating high resolution image L, based on, at least in part, a reconstruction model 800 for red component (or subpixel) generation illustrated by FIG. 8. As illustrated by 805, each square of reconstruction model 800 represents a pixel in virtual image L', in which $\alpha_k$, $\beta_k$, k=1, 2, 3, 4; and $\alpha_k+\beta_k=1$ for each k is satisfied.

As such, the $(i,j)^{th}$ pixel $(r_{i,j}, g_{i,j}, b_{i,j})$ in S corresponds to a 3×3 block, or array 810, of pixels in L' at locations (k, l), with k=3i−2, 3i−1, or 3i; and l=3j−2, 3j−1, or 3j. Reconstruction component 710 can copy red subpixel $r_{i,j}$ of the $(i,j)^{th}$ pixel of S to a first location (3i−2, 3j−2), at 820, of L'; green subpixel $g_{i,j}$ of the $(i,j)^{th}$ pixel of S to a second location (3i−1, 3j−1), at 830, of L'; and blue subpixel $b_{i,j}$ of the $(i,j)^{th}$ pixel of S to a third location (3i, 3j), at 840, of L'. Further, reconstruction component 710 can generate red components (or red subpixels) neighboring the first location using a directional weighted average.

For example, reconstruction component 710 can generate red components missing from locations (3i−3, 3j−3) of L' and (3i−4, 3j−4) of L' based on equations (1) and (2), respectively, as follows:

$$\alpha_3 r_{i,j} + \beta_3 r_{i-1,j-1}, \quad (1)$$

$$\beta_3 r_{i,j} + \alpha_3 r_{i-1,j-1}. \quad (2)$$

Further, reconstruction component 710 can generate red components missing from locations (3i−2, 3j−1) of L' and (3i−2, 3j) of L' based on equations (3) and (4), respectively, as follows:

$$\alpha_1 r_{i,j} + \beta_1 r_{i,j+1}, \quad (3)$$

$$\beta_1 r_{i,j} + \alpha_1 r_{i,j+1}. \quad (4)$$

In another aspect, reconstruction component 710 can generate green components missing from locations (3i−2, 3j−2) of L' and (3i−3, 3j−3) of L' based on equations (5) and (6), respectively, as follows:

$$\alpha_3 g_{i,j} + \beta_3 g_{i-1,j-1}, \quad (5)$$

$$\beta_3 g_{i,j} + \alpha_3 g_{i-1,j-1}. \quad (6)$$

Further, reconstruction component 710 can generate green components missing from locations (3i−1, 3j) of L' and (3i−1, 3j+1) of L' based on equations (7) and (8), respectively, as follows:

$$\alpha_1 g_{i,j} + \beta_1 g_{i,j+1}, \quad (7)$$

$$\beta_1 g_{i,j} + \alpha_1 g_{i,j+1}. \quad (8)$$

In yet another aspect, reconstruction component 710 can generate blue components missing from locations (3i−1, 3j−1) of L' and (3i−2, 3j−2) of L' based on equations (9) and (10), respectively, as follows:

$$\alpha_3 b_{i,j} + \beta_3 b_{i-1,j-1}, \quad (9)$$

$$\beta_3 b_{i,j} + \alpha_3 b_{i-1,j-1}. \quad (10)$$

Further, reconstruction component 710 can generate blue components missing from locations (3i, 3j+1) of L' and (3i, 3j+2) of L' based on equations (11) and (12), respectively, as follows:

$$\alpha_1 b_{i,j} + \beta_1 b_{i,j+1}, \quad (11)$$

$$\beta_1 b_{i,j} + \alpha_1 b_{i,j+1}. \quad (12)$$

In one aspect, reconstruction component 710 can copy red subpixel $r_{i-1,j-1}$ of the (i−1, j−1)$^{th}$ pixel of S to location (3i−5, 3j−5), at 850, of L'; green subpixel $g_{i-1,j-1}$ of the (i−1, j−1)$^{th}$ pixel of S to a second location (3i−4, 3j−4), at 860, of L'; and blue subpixel $b_{i-1,j-1}$ of the (i−1, j)$^{th}$ pixel of S to a third location (3i, 3j), at 870, of L'. Further, reconstruction component 710 can generate red components (or red subpixels) neighboring $r_{i-1,j-1}$ using a directional weighted average of respective neighboring components as described above.

Further, reconstruction component 710 can copy red subpixels $r_{i-1,j}$, $r_{i-1,j+1}$, $r_{i,j+1}$, $r_{i+1,j+1}$, $r_{i+1,j}$, $r_{i+1,j-1}$, and $r_{i,j-1}$ of corresponding pixels of S to locations 880, 882, 884, 888, 890, and 892, respectively. Further, reconstruction component 710 can copy green and blue subpixels of the corresponding pixels of S to locations of L' in a manner similar to the description above. As such, reconstruction component 710 can generate neighboring red, green, and blue components (or subpixels) using a directional weighted average of respective neighboring components as described above to reconstruct virtual image L'.

Figure 9:
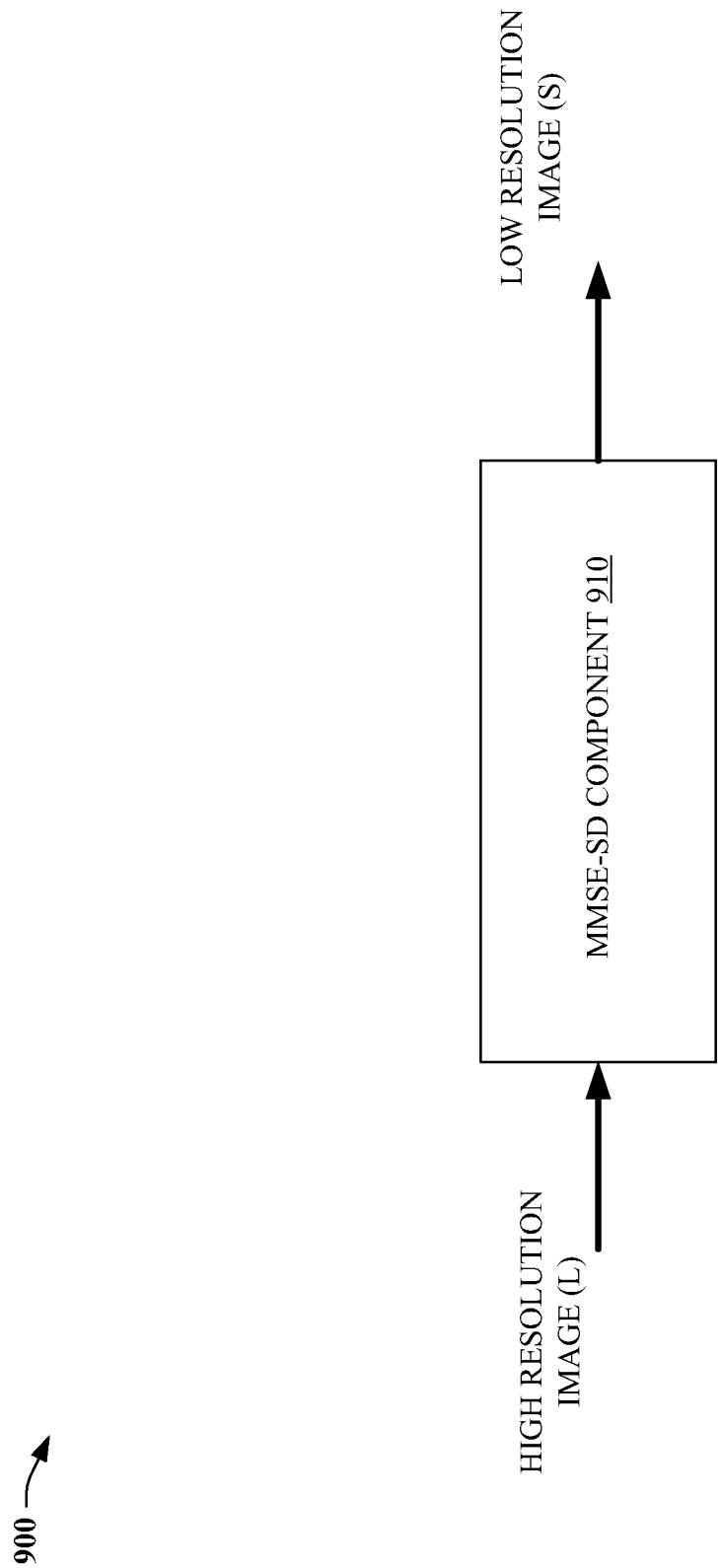
FIG. 9 illustrates a block diagram of a minimum mean square error down-sampling system, in accordance with an embodiment.

FIG. 9 illustrates a minimum mean square error (MMSE) subpixel-based down-sampling (MMSE-SD) system 900, in accordance with an embodiment. MMSE-SD system 900 includes MMSE-SD component 910 that can be configured to determine an optimal low resolution image S. MMSE-SD component 910 can receive information associated with high resolution image L, including 3M×3N color components, or subpixels, R, G, and B of high resolution image L. Further, MMSE-SD can generate 3M×3N color components, or subpixels, R', G', and B' of L' based on reconstruction function $f_r(r)$ associated with Equations 1-4 and 13, reconstruction function $f_g(g)$ associated with Equations 5-8 and 13, and reconstruction $f_b(b)$ associated with Equations 9-12 and 13, respectively.

In an aspect, MMSE-SD component 910 can separately derive subpixels r, g, and b of low resolution image S by minimizing a mean square error (MSE) between L and L', according to Equation 13 as follows:

$$\min_{r,g,b} \|R - R'\|_2^2 + \|G - G'\|_2^2 + \|B - B'\|_2^2 \quad (13)$$

$$\text{s.t. } R' = fr(r)$$

$$G' = fg(g)$$

$$B' = fb(b).$$

As such, MMSE-SD component 910 can derive subpixel r of low resolution image S according to Equations 14-16 as follows:

$$\min_r \|R - R'\|_2^2 \quad (14)$$

$$\text{s.t. } R' = fr(r),$$

$$H_r r = H_R R, \quad (15)$$

$$r = (H_r^{-1} H_R) R = HR, \quad (16)$$

in which $H_r$ and $H_R$ are block-circulant matrices of size MN×MN and MN×9MN, respectively, according to Equations 17-26 as follows; in which R is a row-ordered vector of size 9MN×1 from the red component of L, and r is the row-ordered vector of size MN×1 from the red component of S, respectively, and in which $H = H_r^{-1} H_R$ is a block circulant matrix of size MN×9MN, including blocks of size N×9N that are block-tri-circulant (see below). Each of the N×9N sized blocks include three sub-blocks of size N×3N, and each of the three sub-blocks is block-circulant (see below) with a block size of 1×3:

$$H_r = \begin{vmatrix} A & B_2 & 0 & \ldots & B_1 \\ B_1 & A & B_2 & \ldots & 0 \\ 0 & B_1 & A & B_2 & \ldots \\ \vdots & \ddots & \ddots & \ddots & \vdots \\ B_2 & 0 & \ldots & B_1 & A \end{vmatrix}, \quad (17)$$

$$H_R = \begin{vmatrix} C & D_2 & E_2 & 0 & 0 & 0 & 0 & \ldots & 0 & E_1 & D_1 \\ 0 & E_1 & D_1 & C & D_2 & E_2 & 0 & 0 & 0 & \ldots & 0 \\ \vdots & \ddots & \ddots & \ddots & \ddots & \ddots & \ddots & \ddots & \vdots & \vdots & \vdots \\ 0 & \ldots & 0 & E_1 & D_1 & C & D_2 & E_2 & 0 & 0 & 0 \\ 0 & 0 & 0 & 0 & \ldots & 0 & E_1 & D_1 & C & D_2 & E_2 \end{vmatrix}, \quad (18)$$

-continued $$A = \begin{vmatrix} k_0 & k_1 & 0 & \ldots & k_1 \\ k_1 & k_0 & k_1 & 0 & \ldots \\ \vdots & \ddots & \ddots & \ddots & \vdots \\ 0 & \ldots & k_1 & k_0 & k_1 \\ k_1 & 0 & \ldots & k_1 & k_0 \end{vmatrix},$$ (19)

$$B_1 = \begin{vmatrix} k_2 & k_4 & 0 & \ldots & k_3 \\ k_3 & k_2 & k_4 & 0 & \ldots \\ \vdots & \ddots & \ddots & \ddots & \vdots \\ 0 & \ldots & k_3 & k_2 & k_4 \\ k_4 & 0 & \ldots & k_3 & k_2 \end{vmatrix},$$ (20)

$$B_2 = \begin{vmatrix} k_2 & k_3 & 0 & \ldots & k_4 \\ k_4 & k_2 & k_3 & 0 & \ldots \\ \vdots & \ddots & \ddots & \ddots & \vdots \\ 0 & \ldots & k_4 & k_2 & k_3 \\ k_3 & 0 & \ldots & k_4 & k_2 \end{vmatrix},$$ (21)

in which $k_0 = 1 + 2\alpha_1^2 + 2\beta_1^2 + 2\alpha_2^2 + 2\beta_2^2 + 2\alpha_3^2 + 2\beta_3^2 + 2\alpha_4^2 + 2\beta_4^2$, $k_1 = 2\alpha_1\beta_1$, $k_2 = 2\alpha_2\beta_2$, $k_3 = 2\alpha_3\beta_3$, and $k_4 = 2\alpha_4\beta_4$.

$H_R$ includes M×3M blocks (e.g., either C, $D_1$, $D_2$, $E_1$, $E_2$, or 0), wherein each block of the M×3M blocks is a matrix of size N×3N as described by Equations 22-26 as follows:

$$C = \begin{vmatrix} 1 & \alpha_1 & \beta_1 & 0 & 0 & \ldots & \beta_1 & \alpha_1 \\ 0 & \beta_1 & \alpha_1 & 1 & \alpha_1 & \beta_1 & \ldots & 0 \\ \vdots & \ddots & \ddots & \ddots & \ddots & \ddots & \ddots & \vdots \\ 0 & \ldots & 0 & \beta_1 & \alpha_1 & 1 & \alpha_1 & \beta_1 \end{vmatrix},$$ (22)

$$D_1 = \begin{vmatrix} \alpha_2 & \alpha_4 & 0 & 0 & 0 & \ldots & 0 & \alpha_3 \\ 0 & 0 & \alpha_3 & \alpha_2 & \alpha_4 & 0 & \ldots & 0 \\ \vdots & \ddots & \ddots & \ddots & \ddots & \ddots & \ddots & \vdots \\ 0 & \ldots & 0 & 0 & \alpha_3 & \alpha_2 & \alpha_4 & 0 \end{vmatrix},$$ (23)

$$D_2 = \begin{vmatrix} \alpha_2 & \alpha_3 & 0 & 0 & 0 & \ldots & 0 & \alpha_4 \\ 0 & 0 & \alpha_4 & \alpha_2 & \alpha_3 & 0 & \ldots & 0 \\ \vdots & \ddots & \ddots & \ddots & \ddots & \ddots & \ddots & \vdots \\ 0 & \ldots & 0 & 0 & \alpha_4 & \alpha_2 & \alpha_3 & 0 \end{vmatrix},$$ (24)

$$E_1 = \begin{vmatrix} \beta_2 & 0 & \beta_4 & 0 & \ldots & 0 & \beta_3 & 0 \\ 0 & \beta_3 & 0 & \beta_2 & 0 & \beta_4 & \ldots & 0 \\ \vdots & \ddots & \ddots & \ddots & \ddots & \ddots & \ddots & \vdots \\ 0 & \ldots & 0 & \beta_3 & 0 & \beta_2 & 0 & \beta_4 \end{vmatrix},$$ (25)

$$E_2 = \begin{vmatrix} \beta_2 & 0 & \beta_3 & 0 & \ldots & 0 & \beta_4 & 0 \\ 0 & \beta_4 & 0 & \beta_2 & 0 & \beta_3 & \ldots & 0 \\ \vdots & \ddots & \ddots & \ddots & \ddots & \ddots & \ddots & \vdots \\ 0 & \ldots & 0 & \beta_4 & 0 & \beta_2 & 0 & \beta_3 \end{vmatrix}.$$ (26)

Consider 3 elements in the first row of C as a block, such as [1 $\alpha_1$ $\beta_1$]. Such a block is repeatedly shifted to the right by 3 positions in the subsequent rows. Thus, each of C, $D_1$, $D_2$, $E_1$, $E_2$, or 0 is block-circulant. Similarly, considering 3 sub-blocks of $H_R$ in the horizontal direction (e.g. [C $D_2$ $E_2$]) as a block, which appears in the first row in $H_R$ and is repeatedly shifted to the right by 3 block positions in the subsequent rows, $H_R$ is a "block-circulant" matrix.

Here, we call a matrix of size N×9N "block-tri-circulant" if it contains three sub-blocks of size N×3N, each of which is block-circulant (e.g. [C $D_2$ $E_2$] is block-tri-circulant). Therefore, $H_R$ is a block circulant matrix, with blocks of size N×9N that are block-tri-circulant.

As described above, H is a block circulant matrix of size MN×9MN, including N×9N blocks that are block-tri-circulant. Each of the N×9N blocks include three sub-blocks of size N×3N, and each of the three sub-blocks is block-circulant with a block size of 1×3. In other words, each row of a $(k,l)^{th}$ sub-block, k=1, . . . , M, and l=1, . . . , 3M, of the N×9 N blocks of block circulant matrix H has 3N coefficients and is equal to the previous row rotated, or shifted, to the right by 3 sub-block positions. The $m^{th}$ row of the $(k,l)^{th}$ sub-block of H is associated with an inner-product with the $l^{th}$ row of L and adds a term to the $m^{th}$ element of the $k^{th}$ row of S, i.e., the $(k,m)^{th}$ pixel of S.

MMSE-SD component 910 can be configured to generate a 3N×3N circulant matrix using the first row of the $(k,l)^{'h}$ sub-block, as the row has 3N coefficients and is equal to the previous row rotated to the right by 3 sub-block positions. Further, MMSE-SD component 910 can perform a 3:1 down-sampling on the 3N×3N circulant matrix in a vertical direction utilizing Equation 27 described below:

$$I_a(i, j) = \begin{cases} 1, & i = 1, \ldots, N, j = 3i-2; \\ 0, & \text{otherwise.} \end{cases}$$ (27)

Thus, MMSE-SD component 910 can be configured to (1) perform a 1-D convolution of the first row of the $(k,l)^{th}$ sub-block of block circulant matrix H with a periodic extension of the $l^{th}$ row of L to generate a row of size 3N; (2) perform a 3:1 down-sampling of the row of size 3N in a horizontal direction; and (3) add a result of the 3:1 down-sampling to the $k^{th}$ row of S.

In an aspect, MMSE-SD component 910 can perform such operations of first rows of sub-blocks of block circulant matrix H on L (with k=1, l=1, . . . , 3M), effectively applying a 2-D spatial-invariant linear filter on a periodic extension of L to obtain a row of size 3N, in which MMSE-SD can obtain coefficients of the 2-D spatial-invariant filter from the first row of block circulant matrix H. Further, MMSE-SD component 910 can 3:1 down-sample the row in a horizontal direction to obtain the $1^{st}$ row of S.

As stated above, H is a block-circulant matrix including N×9N blocks that are block-tri-circulant (each block including three sub-blocks of size N×3N that are block-circulant). Further, each row of the N×9N blocks can be considered as a row of sub-blocks of size N×3N, in which each row of sub-blocks is equivalent to a previous row rotated to the right by 3 sub-block positions. As such, in an embodiment, MMSE-SD component 910 can be configured to generate a derived block-circulant matrix of size 3MN×9MN that includes blocks of size N×3N. Further, MMSE-SD component 910 can be configured to compute H as the product of a matrix $I_b$ (defined by Equation 28 below) of size MN×3MN and the derived block-circulant matrix:

$$I_b(i, j) = \begin{cases} I_N, & i = 1, \ldots, M, j = 3i-2; \\ 0, & \text{otherwise.} \end{cases}$$ (27)

In one aspect, the product of matrix $I_b$ and the derived block-circulant matrix is a 3:1 down-sampling on the sub-blocks of the derived block-circulant matrix in a vertical direction. As such, MMSE-SD component 910 applies a 2-D spatial-invariant filter, of size 3M×3N, on the periodic extension of L to obtain an image of size 3N×3N. Such a filter can be independent of high resolution image (L), and thus precomputed and stored, e.g., in a storage medium. In an aspect, the 2-D spatial-invariant filter can be set to a size k×k, e.g., k=15. Further MMSE-SD component 910 can 3:1 down-sample the image in a horizontal direction and 3:1 down-sample the image in a vertical direction.

Figure 10:
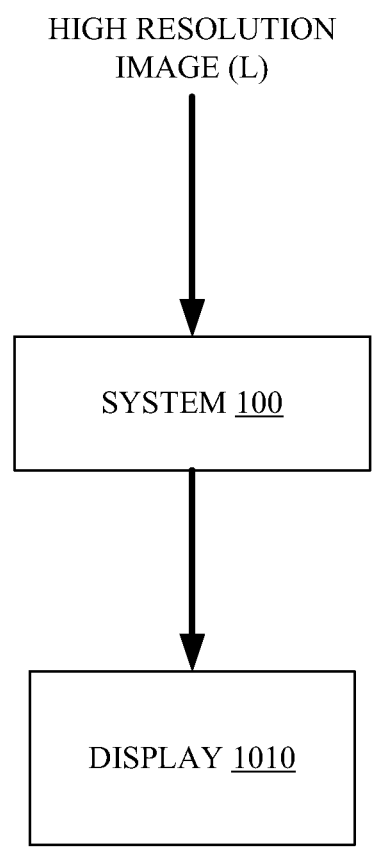
FIG. 10 illustrates a block diagram of a down-sampling environment including a display, in accordance with an embodiment.

Now referring to FIG. 10, a block diagram of a down-sampling environment 1000 including a low resolution display 1010 is illustrated, in accordance with an embodiment. Down-sampling environment 1000 can include system 100, which can receive high resolution image (L) associated with, e.g., HDTV information, HD movies, etc. System 100 can include display interface component (not shown), that can couple to display 1010 to display a low resolution image (S) including subpixels sampled and/or generated, e.g., via sampling component 110 of system 100, from high resolution image (L). Display 1010 can include a lower resolution display, e.g., included in a handheld device such as a cellular phone, a PMP, a PDA, etc.

Figure 11:
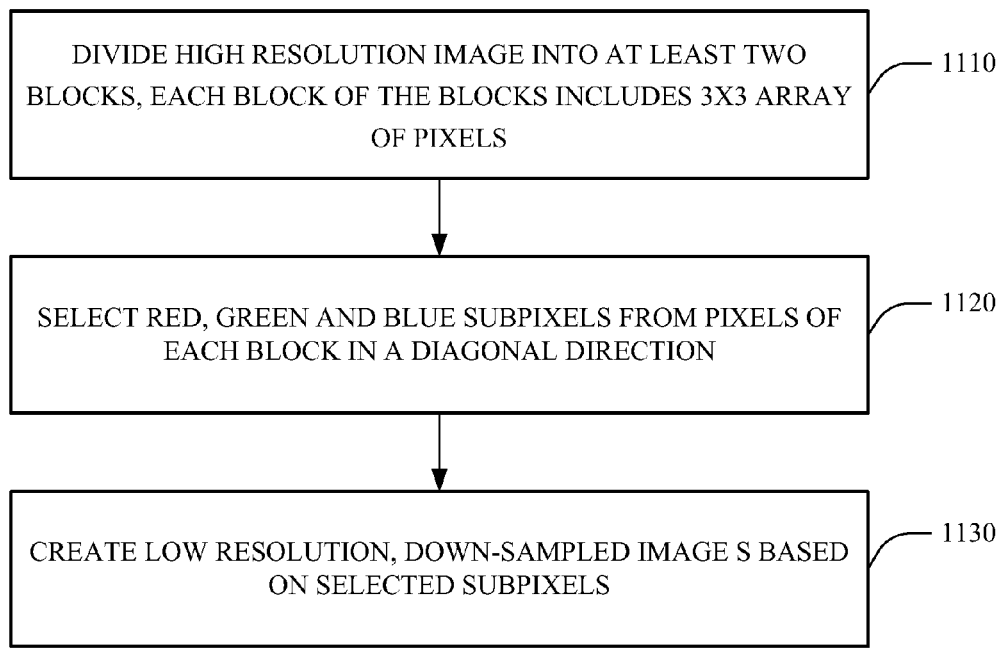
FIGS. 11-12 illustrate various processes associated with minimum mean square error subpixel-based down-sampling (MMSE-SD), in accordance with an embodiment.
Figure 12:
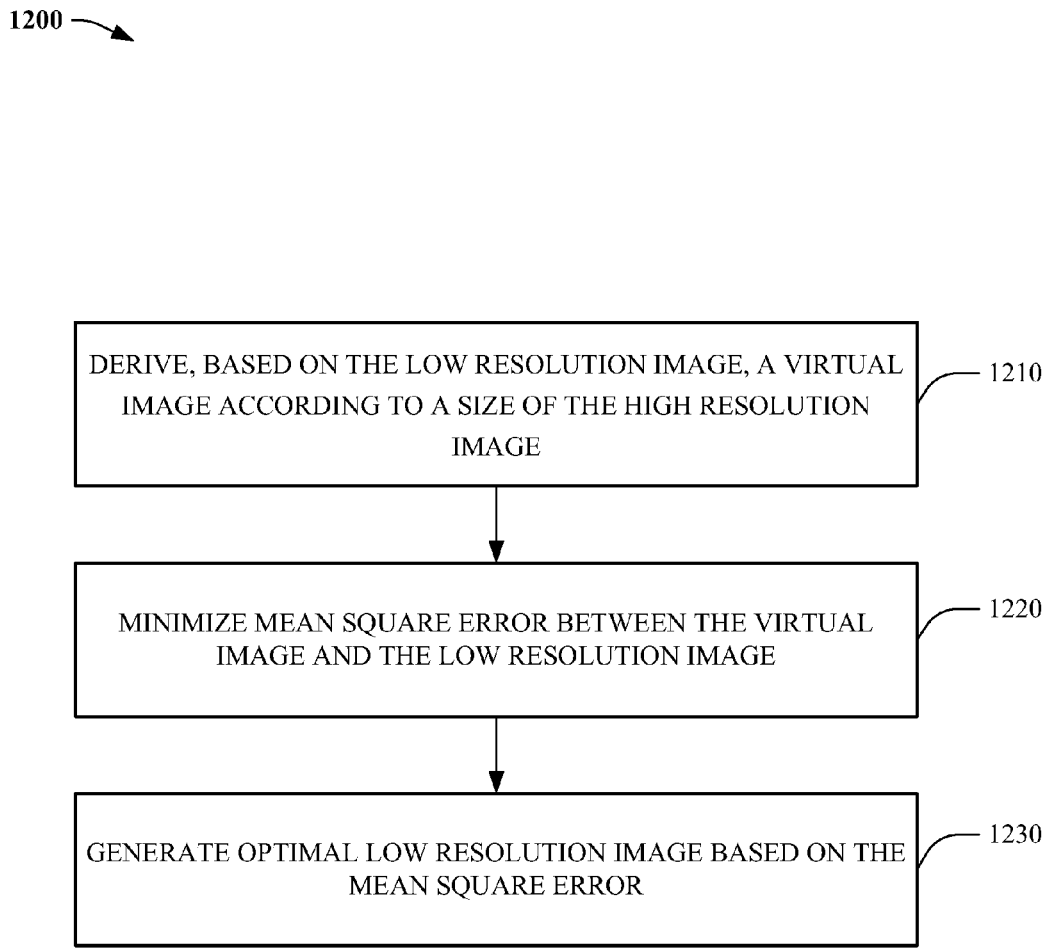

FIGS. 11-12 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 11, a process 1100 associated with minimum mean square error subpixel-based down-sampling (MMSE-SD) is illustrated, in accordance with an embodiment. At 1110, a high resolution image can be divided into at least two blocks, wherein each block of the at least two blocks includes a 3×3 array of pixels. Red, green, and blue subpixels can be diagonally selected from respective adjacent pixels of each block of the at least two blocks at 1120. At 1130, a low resolution, down-sampled image S can be created based on subpixels selected at 1120.

FIG. 12 illustrates a process 1200 for creating an optimal low resolution image (S), in accordance with an embodiment. At 1210, a virtual image can be derived, based on the low resolution image created at 1120 (see FIG. 11). Mean square error between the virtual image and the low resolution image can be minimized at 1220. At 1230, the optimal low resolution image (S) can be created, generated, etc. based on a result of step 1220.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in storage systems described above, non-volatile memory 1322 (see below), disk storage 1324 (see below), and memory storage 1346 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 13:
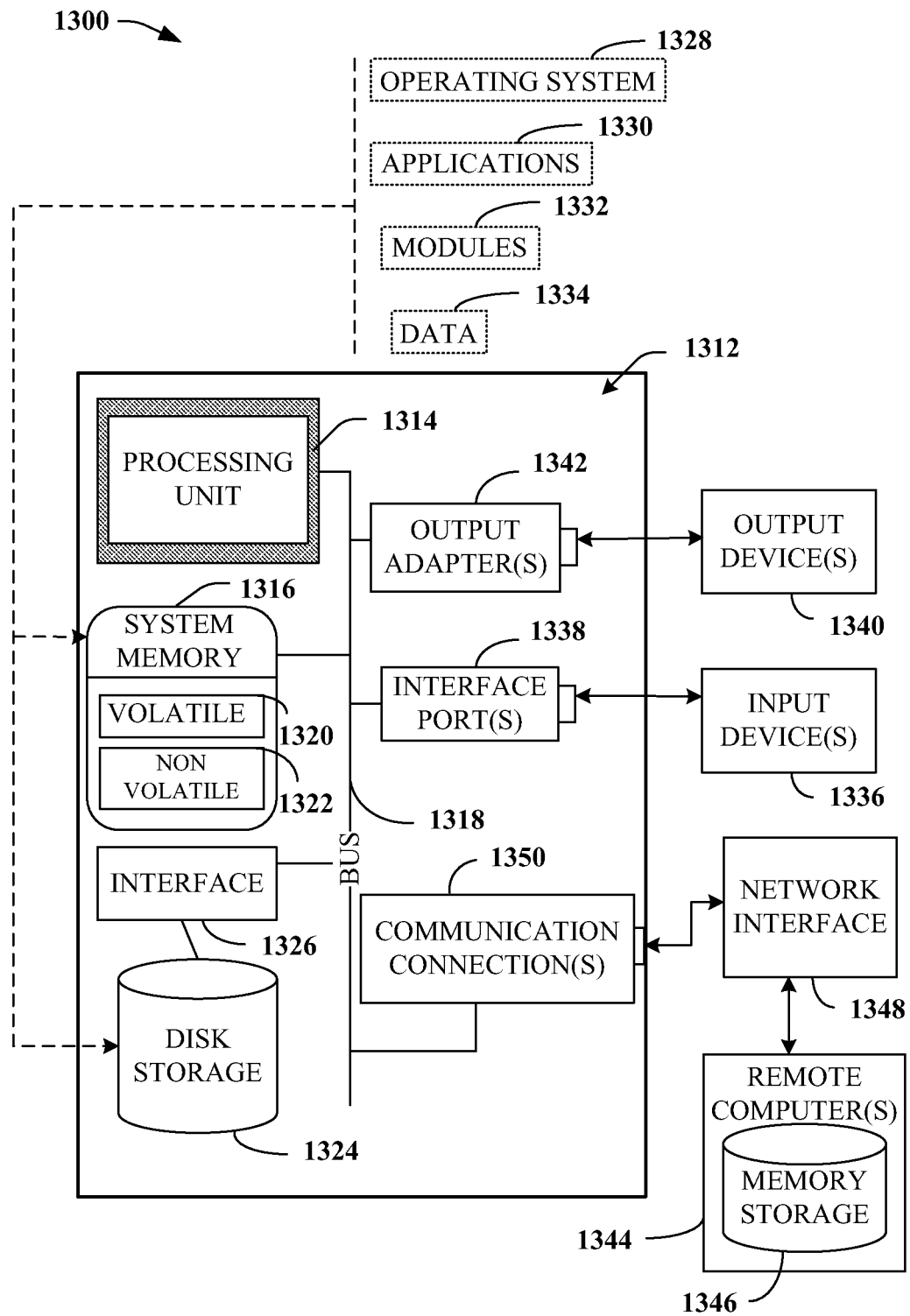
FIG. 13 illustrates a block diagram of a computing system operable to execute the disclosed systems and methods, in accordance with an embodiment.

In order to provide a context for the various aspects of the disclosed subject matter, FIG. 13, and the following discussion, are intended to provide a brief, general description of a suitable environment in which the various aspects of the disclosed subject matter can be implemented, e.g., various processes associated with FIGS. 1-12. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 13, a block diagram of a computing system 1300 operable to execute the disclosed systems and methods is illustrated, in accordance with an embodiment. Computer 1312 includes a processing unit 1314, a system memory 1316, and a system bus 1318. System bus 1318 couples system components including, but not limited to, system memory 1316 to processing unit 1314. Processing unit 1314 can be any of various available processors. Dual microprocessors and other multiprocessor architectures also can be employed as processing unit 1314.

System bus 1318 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1194), and Small Computer Systems Interface (SCSI).

System memory 1316 includes volatile memory 1320 and nonvolatile memory 1322. A basic input/output system (BIOS), containing routines to transfer information between elements within computer 1312, such as during start-up, can be stored in nonvolatile memory 1322. By way of illustration, and not limitation, nonvolatile memory 1322 can include ROM, PROM, EPROM, EEPROM, or flash memory. Volatile memory 1320 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1312 can also include removable/non-removable, volatile/non-volatile computer storage media, networked attached storage (NAS), e.g., SAN storage, etc. FIG. 13 illustrates, for example, disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to system bus 1318, a removable or non-removable interface is typically used, such as interface 1326.

It is to be appreciated that FIG. 13 describes software that acts as an intermediary between users and computer resources described in suitable operating environment 1300. Such software includes an operating system 1328. Operating system 1328, which can be stored on disk storage 1324, acts to control and allocate resources of computer 1312. System applications 1330 take advantage of the management of resources by operating system 1328 through program modules 1332 and program data 1334 stored either in system memory 1316 or on disk storage 1324. It is to be appreciated that the disclosed subject matter can be implemented with various operating systems or combinations of operating systems.

A user can enter commands or information into computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1314 through system bus 1318 via interface port(s) 1338. Interface port(s) 1338 include, for example, a serial port, a parallel port, a game port, and a universal serial bus (USB). Output device(s) 1340 use some of the same type of ports as input device(s) 1336.

Thus, for example, a USB port can be used to provide input to computer 1312 and to output information from computer 1312 to an output device 1340. Output adapter 1342 is provided to illustrate that there are some output devices 1340 like monitors, speakers, and printers, among other output devices 1340, which use special adapters. Output adapters 1342 include, by way of illustration and not limitation, video and sound cards that provide means of connection between output device 1340 and system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. Remote computer(s) 1344 can be a personal computer, a server, a router, a network PC, a workstation, a microprocessor based appliance, a peer device, or other common network node and the like, and typically includes many or all of the elements described relative to computer 1312.

For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refer(s) to hardware/software employed to connect network interface 1348 to bus 1318. While communication connection 1350 is shown for illustrative clarity inside computer 1312, it can also be external to computer 1312. The hardware/software for connection to network interface 1348 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
partitioning, by a system comprising a processing device, a two-dimensional (2-D) array of pixels into at least 3 pixel by at least 3 pixel blocks, wherein pixels of a block of the at least 3pixel by at least 3 pixel blocks comprise at least 3 subpixels;
alternately down-sampling selected subpixels of the pixels of the block in a diagonal direction; and
generating an image based on a result of the alternately sampling the selected subpixels.

2. The method of claim 1, wherein the alternately down-sampling the selected subpixels comprises alternately selecting a red subpixel, a green subpixel, and a blue subpixel from consecutive pixels of the block in the diagonal direction.

3. The method of claim 1, further comprising:
deriving, based on the image, a virtual image according to a size of another image associated with the 2-D array of pixels.

4. The method of claim 3, wherein the generating the image comprises minimizing a mean square error between the virtual image and the other image.

5. The method of claim 1, wherein the generating the image comprises determining at least one color component of a defined low resolution image associated with the result based on a block circulant matrix.

6. The method of claim 5, wherein the determining the at least one color component includes determining the at least one color component based on a block circulant matrix of size MN×9MN including N×9N arrays of blocks that are block-tri-circulant.

7. A system comprising:
a memory to store instructions; and
a processor, coupled to the memory, that executes or facilitates execution of the instructions to at least:
receive a first array of pixels;
divide the first array of pixels into 3 or more pixel ×3 or more pixel blocks, wherein pixels of a block of the 3 or more pixel ×3 or more pixel blocks comprise at least 3subpixels;
alternately down-sample selected subpixels of the at least 3 subpixels of the pixels of the block in a diagonal direction; and
generate a second array of pixels based on the selected subpixels.

8. The system of claim 7, wherein the processor further executes or facilitates the execution of the instructions to:
alternately sample a red subpixel, a green subpixel, and a blue subpixel of adjacent pixels of the block in the diagonal direction; and
generate the second array of pixels based on the red subpixel, the green subpixel, and the blue subpixel.

9. The system of claim 7, wherein the processor further executes or facilitates the execution of the instructions to alternately select the selected subpixels in the diagonal direction.

10. The system of claim 7, wherein the processor further executes or facilitates the execution of the instructions to create a virtual image based on the second array of pixels.

11. The system of claim 10, wherein the processor further executes or facilitates the execution of the instructions to create the virtual image utilizing a directional weighted average of neighboring subpixels of the second array of pixels.

12. The system of claim 10, wherein the processor further executes or facilitates the execution of the instructions to determine a first resolution image that satisfies a defined criterion based on respective color components of the virtual image and a second resolution image associated with the first array of pixels, wherein the second resolution image has a resolution higher than the first resolution image.

13. The system of claim 12, wherein the processor further executes or facilitates the execution of the instructions to:
minimize a mean square error between the virtual image and the second resolution image; and
determine the first resolution image based on the first resolution image being determined to satisfy a condition with respect to the mean square error.

14. The system of claim 12, wherein the processor further executes or facilitates the execution of the instructions to determine color components of the first resolution image according to a block circulant matrix.

15. The system of claim 14, wherein the block circulant matrix is an MN×9MN matrix including N×9N arrays of blocks that are block-tri-circulant.

16. An apparatus, comprising:
means for dividing a first resolution image into at least 3 pixel × at least 3 pixel blocks, wherein pixels of a block of the at least 3 pixel × at least 3 pixel blocks comprise at least 3subpixels;
means for alternately selecting subpixels of the pixels of the block along a diagonal direction; and
means for creating a second resolution image based on the subpixels selected by the means for alternately selecting, wherein the first resolution image is defined to have a higher resolution than the second resolution image.

17. The apparatus of claim 16, further comprising:
means for creating a virtual high resolution image using the second resolution image.

18. The apparatus of claim 17, further comprising:
means for minimizing a mean square error between the first resolution image and the virtual image; and
means for determining another second resolution image based on an output of the means for minimizing the mean square error.

19. A computer readable storage device comprising computer-executable instructions that, in response to execution, cause a system comprising a processor to perform operations, comprising:
dividing a first resolution image into m pixel by m pixel blocks, wherein pixels of a block of the m pixel by m pixel blocks comprise n subpixels, wherein m and n are integers that are at least 3;
alternately selecting selected subpixels of the n subpixels of the pixels of the block along a diagonal direction; and
generating a second resolution image based on the selected subpixels, wherein the first resolution image is defined to have a higher resolution than the second resolution image.

20. The computer readable storage device of claim 19, wherein the operations further comprise:
generating a virtual high resolution image using the second resolution image;
minimizing a mean square error between the first resolution image and the virtual high resolution image; and
determining another second resolution image based on an output of the minimizing the mean square error.

* * * * *